United States Patent [19]

Miller, Jr. et al.

[11] Patent Number: 5,224,208
[45] Date of Patent: Jun. 29, 1993

[54] GRADIENT CALCULATION FOR TEXTURE MAPPING

[75] Inventors: Robert H. Miller, Jr., Loveland; Roger W. Swanson, Fort Collins, both of Colo.

[73] Assignee: Hewlett-Packard Company, Palo Alto, Calif.

[21] Appl. No.: 494,708

[22] Filed: Mar. 16, 1990

[51] Int. Cl.$^5$ .............................................. G06F 15/72
[52] U.S. Cl. .................................. 395/125; 395/130; 395/126
[58] Field of Search ............... 395/125, 130, 126, 127, 395/136, 128; 340/729, 728

[56] References Cited

U.S. PATENT DOCUMENTS

| | | | |
|---|---|---|---|
| 4,343,037 | 8/1982 | Bolton | 395/130 |
| 4,615,013 | 9/1986 | Yan et al. | 395/130 |
| 4,855,934 | 8/1989 | Robinson | 395/130 |
| 4,888,713 | 12/1989 | Falk | 395/125 |
| 4,935,879 | 6/1990 | Ueda | 395/130 |
| 4,974,177 | 11/1990 | Nishiguchi | 395/125 |
| 5,097,427 | 3/1992 | Lathrop et al. | 395/130 |
| 5,103,217 | 4/1992 | Cawley | 395/129 |

OTHER PUBLICATIONS

P. S. Heckbert, "Survey of Texture Mapping," IEEE, CG&A, vol. 6, No. 11, Nov. 1986, pp. 56–67.
Perny et al., "Perspective Mapping of Planar Textures," Computer Graphics, vol. 16, No. 1, May 1982, pp. 70–100.
Lance Williams, "Pyramidal Parametrics," Computer Graphics, vol. 17, No. 3, Jul. 1983, pp. 1–11.

*Primary Examiner*—Gary V. Harkcom
*Assistant Examiner*—Raymond J. Bayerl

[57] ABSTRACT

A method and apparatus for performing the majority of texture map gradient calculations once per polygon so as to increase processing speed in a graphics system. Texture values are identified for each vertex of an input polygon and are interpolated over the polygon in perspective space in order to find the corresponding values at a given pixel within the polygon. The perspective values of the vertices are linearly interpolated across the polygon to determine the value at the given pixel. The texture gradients are then calculated by defining vectors perpendicular and parallel to the horizon of the plane containing the input polygon so that the resulting components may be calculated. The resulting value is the texture gradient, which may then be used to address a texture map to determine the pre-filtered texture value for that point. A hardware implementation performs the necessary calculations for each pixel in the input polygon. The invention so arranged removes artifacts in the texture mapped image at a low cost and at a high speed.

9 Claims, 3 Drawing Sheets

GRADIENT CALCULATION FOR TEXTURE MAPPING

BACKGROUND OF THE INVENTION

1. Field of the Invention

The present invention relates to a method and apparatus for calculating the gradients of texture map parameters in perspective space, and more particularly, to a method and apparatus for calculating the indices to a texture map for all pixels of an input polygon only from the texture map parameters at the vertices of the input polygon and the gradients of the texture map parameters in perspective space.

2. Description of the Prior Art

Texture mapping is a well-known technique for creating more detail and realism in an image without geometrically modeling and rendering every three-dimensional detail of a surface. Simply stated, texture mapping is the process of mapping an image, the texture, onto a three-dimensional surface. A texture can define an object-'color, describe the perturbation of surface normals to simulate a bumpy surface, or define the transparency of a surface, but texture mapping also has been applied to a number of other surface attributes such as specularity, illumination, surface displacement and the like. For example, using texture mapping it is possible to simulate the wood grain of a desk top or to model the rough surface of cast iron, thereby greatly improving the realism of the resulting image.

A texture is more particularly defined as a detailed pattern repeated many times to tile a particular plane, as in the wood grain or cast iron example above, or as a multi-dimensional image mapped to a multi-dimensional space. Texture mapping can also be redefined as the mapping of a function onto a surface in three dimensions. The domain of the function can be one, two, or three-dimensional, and it can be represented by either an array or a mathematical function. As used herein, textures will usually be two-dimensional arrays representing a source image (texture) which is mapped onto a surface in three-dimensional object space and which is then mapped to the display screen by the viewing projection. Texture space will be referred to herein by the labels (s,t), although (s,t) is interchangeable with (u,v) as used in the prior art and may thus be referred to as (u,v) as well. Object space (real world coordinates) will be referred to as $(x_o, y_o, z_o)$, while screen space will be referred to as (x,y).

Texture mapping has been used since at least 1974 when Catmull proposed to map textures onto bivariate surface patches. Since then, as noted above, several methods have been proposed for texture mapping parameters such as surface color, specular reflection, normal vector perturbation (bump mapping), specularity, transparency, diffused reflection, shadows, surface displacement, mixing coefficients and local coordinate systems (frame mapping), while yet other methods have provided new techniques for anti-aliasing textured images. However, many of these approaches are very compute-intensive and are thus too slow to be used in an interactive three-dimensional graphics environment.

The mapping from texture space (s,t) to screen space (x,y) may be split into two phases. First, a surface parameterization maps the texture space (s,t) to object space $(x_o, y_o, z_o)$, which is followed by the standard modeling and viewing transformations for mapping object space $(x_o, y_o, z_o)$ to screen space (x,y). Preferably, the viewing transformation is a perspective projection as described in copending application Ser. No. 07/493,189 filed Mar. 14, 1990 assigned to the assignee of this invention and hereby incorporated herein by reference in its entirety. These two mappings are then composed to find the overall two-dimensional texture space to two-dimensional screen space mapping.

As described by Heckbert in "Survey of Texture Mapping," *IEEE Computer Graphics and Applications*, Vol. 6, No. 11, Nov. 1986, pp. 56–67, there are several general approaches to drawing a texture-mapped surface. Screen order scanning, sometimes called inverse mapping, is the most common method. This method is preferable when the screen must be written sequentially, the mapping is readily invertible and the texture is random access. According to this technique, the pre-image of the pixel in texture space is found for each pixel in screen space and this area is filtered. Texture order scanning, on the other hand, does not require inversion of the mapping as with screen order scanning, but uniform sampling of texture space does not guarantee uniform sampling of screen space except for linear mappings. Thus, for non-linear mappings texture subdivision often must be done adaptively to prevent holes or overlaps in screen space. Finally, two-pass scanning methods may be used to decompose a two-dimensional mapping into two one-dimensional mappings, with the first pass applied to the rows of an image and the second pass applied to the columns of the image. The two-pass methods work particularly well for linear and perspective mappings, where the warps for each pass are linear or rational linear functions. Moreover, because the mapping and filter are one-dimensional, they may be used with graphics pipeline processors. Such techniques are used, for example, for accessing MIP maps as described by Williams in an article entitled "Pyramidal Parametrics," *Computer Graphics* (Proc. SIGGRAPH 83), Vol. 17, No. 3, Jul. 1984, pp. 213–222.

Mapping a two-dimensional texture onto a surface in three dimensions requires a parameterization of the surface. Heckbert notes that simple polygons such as triangles may be easily parameterized by specifying the texture space coordinates (s,t) at each of its three vertices. This defines a linear mapping between texture space (s,t) and three-dimensional object space $(x_o, y_o, z_o)$, where each of the coordinates in object space has the form $As+Bt+C$. For polygons with more than three sides, on the other hand, non-linear functions are generally needed. One such non-linear paramerization is the bilinear patch described by Heckbert which maps rectangles to planar or nonplanar quadrilaterals. Planar quadrilaterals may also be parameterized by "perspective mapping", where a homogeneous perspective value W is divided into the $x_o$, $y_o$ and $z_o$ and $z_0$ components to calculate the true object space coordinates. An example of a method of perspective mapping is described in detail in the above-mentioned copending application Ser. No. 07/493,189.

After the texture mapping is computed and the texture warped, the image must be resampled on the screen grid. This process is called filtering. The cheapest and simplest texture filtering method is point sampling, where the pixel nearest the desired sample point is used. However, for stretched images the texture pixels are visible as large blocks when this technique is used, and for shrunken images aliasing can cause distracting moire patterns. Such aliasing results when an image signal has unreproducible high frequencies, but aliasing can be reduced by filtering out these high frequencies or by point sampling at a higher resolution. Such techniques are well known for solving the aliasing problem for linear warps; however, for nonlinear warps such as perspective, aliasing has remained a problem. Approximate techniques for reducing aliasing for nonlinear warps are summarized in the aforementioned Heckbert article.

Generally, the nonlinear textures can be prefiltered so that during rendering only a few samples will be accessed for each screen pixel. For example, a color image pyramid (MIP map) as described in the aforementioned Williams article may be used, or preferably, a RIP map, as described in copending application Ser. No. 07/494,706 filed Mar. 16, 1990 assigned to the assignee of this invention and hereby incorporated herein by reference in its entirety, may be used. The texture address into a RIP map is generated using the values s, t, $\nabla s$ and $\nabla t$, for example. Accordingly, the primary requirements for good anti-aliasing is to access texture maps storing prefiltered texture values by determining texture space coordinates (s,t) for each screen pixel plus the partial derivatives of s and t with respect to screen coordinates (x,y).

The partial derivatives (gradients) of the s and t parameters have been calculated in software in prior art devices by calculating the gradients of s and t for all pixels in an input polygon by approximation, based upon a constant value, by linear interpolation of s and t across the polygon, or more accurately by a difference method. For example, in accordance with the difference method, s and t have been calculated from a few points in the vicinity of the pixel and then used to measure the gradients of s and t. However, as noted above, this technique is quite compute intensive and requires the s and t data of numerous adjacent pixels to be stored and several computations to be performed for each pixel. In a parallel processing environment, this need for adjacent s and t values increases the need for inter-processor communication and synchronization. Also, the values of s and t must be quite precise to do a meaningful computation. Moreover, if an input polygon is one pixel in size, the extra sample points have to be taken at subpixel resolution to calculate the gradient. Furthermore, sampling of s and t is generally only in the horizontal direction since most prior art hardware is row directed. Thus, this technique works best in the prior art when it is assumed that the gradients of s and t are constant over the polygon so that the gradients need only be calculated once per polygon.

However, for nonlinear mapping, as when perspective interpolation is performed, gradients typically have been calculated on a per pixel basis. In such systems, if the analytical formulas for the partial derivatives (texture gradients) were not available, they were approximated by determining the differences between the s and t values of neighboring pixels. In addition, bump mapping requires additional information at each pixel, namely, two vectors tangent to the surface pointing in the s and t directions. These tangents may be constant across the polygon or may vary, but to ensure artifact-free bump mapping these tangents must be continuous across polygon seams. One way to guarantee this is to compute tangents at all polygon vertices during model preparation and to interpolate them across the polygon. The normal vector is thus computed as the cross product of the tangents. However, such techniques are tedious in that numerous computations must be performed at each pixel and in that the s and t information for neighboring pixels must be kept in memory. As a result, these techniques are relatively slow and thus do not allow for textures to be processed in a user interactive environment.

Thus, texture mapping is a powerful technique for providing visual detail in an image without greatly adding to the complexity of the geometric model. As noted above, algorithms for accessing texture maps and anti-aliasing texture mapped images have existed for a number of years. A more detailed description of these and other prior art texture mapping techniques may be found in the Heckbert article and the extensive bibliography included therein. However, most of the work in the prior art has centered around software solutions which provide excellent image quality but lack the performance required to make this feature useful in an interactive design environment. It is desirable that a hardware system for providing texture mapping for use in graphics pipeline architecture be designed whereby high performance can be attained which permits the resulting graphics system to be user interactive. It is also desirable that true perspective interpolation be performed on the texture parameters so that the resulting image can be displayed in proper perspective and that filtering be done to avoid undesirable aliasing problems.

Accordingly, there is a long-felt need in the art for a graphics display system which can perform gradient interpolation for texture mapping in a user interactive environment for three-dimensional graphics. In particular, there is a long-felt need in the art for a hardware implemented texture mapping system whereby texture map gradients may be accurately interpolated over an input polygon without requiring the use of the s and t data of adjacent pixels of a pixel to be interpolated. The present invention has been designed to meet these needs.

SUMMARY OF THE INVENTION

The above-mentioned long-felt need has been met in accordance with the present invention by providing means for calculating texture map gradients for each display point to be displayed on a display device directly from the texture map value of respective vertices of input polygons rather than by interpolating over a plurality of adjacent pixels. In addition, the texture map calculation in accordance with the invention also preferably accounts for perspective foreshortening in the texture map values by interpolating the texture map values in perspective space. The calculation method of the invention is beneficial since it may be easily implemented in dedicated hardware for high speed operation at a low cost.

In accordance with the invention, a method is provided for calculating at least one texture map gradient at each display point to be displayed on a display device, the method comprising the steps of:

providing polygon vertex data for each vertex of an input polygon to be displayed, the polygon vertex data including at least one texture value for display points corresponding to each vertex; and calculating directly from the at least one texture value of respective vertices of a particular input polygon the at least one texture map gradient for each display point of the particular input polygon.

A preferred method of the invention also includes the further step of determining a texture map address for each display point from the at least one calculated texture map gradient for that display point. The method of the invention as so defined is beneficial in that it may be used whether the at least one texture value varies linearly or nonlinearly from display point to display point within the particular input polygon without sacrificing accuracy. Moreover, by interpolating the texture values in nonlinear perspective space, the at least one texture map gradient may be corrected for perspective distortions. Also, since the texture gradient is calculated at each pixel using data pertaining to that point only (not neighboring pixels), the processing efficiency of the graphics system may be greatly improved in accordance with the invention.

In accordance with a preferred method of the invention, the texture map gradient VG may be calculated in the calculating step for each pixel in display space using a value of texture coordinate G at each pixel in accordance with the equation:

$$|\nabla G| = 1/W * (K_1^2 + (K_2(G-G_0))^2)^{\frac{1}{2}}$$

where:
  W is an interpolated perspective value of the pixel having texture coordinate G;
  $G_0$ is a texture coordinate value of a point where a vector normal to the input polygon intersects a viewpoint of the input polygon in world space;
  $K_1 = W*h$, where h is a vector parallel to a W contour line in which W has a constant value over the input polygon; and
  $K_2 = K_1/(G_1 - G_0)$, where $G_1$ is a texture coordinate value where the slope of a G contour line in which G has a constant value over the input polygon is one.

The above calculation may be performed at user interactive speeds by implementing the equation in dedicated hardware which performs the steps of:
  once per input polygon, determining $G_0$, $\log_2(K_1)$ and $\log_2(K_2)$;
  determining, by perspective interpolation, a value of G for a pixel of the input polygon using values of G at vertices of the input polygon;
  determining $\log_2 |G-G_0|$;
  determining a value of W for the pixel of the input polygon by linear interpolation;
  determining $\log_2(1/W)$;
  selectively adding $\log_2|G-G_0|$, $\log_2(1/W)$, $\log_2(K_1)$ and $\log_2(K_2)$ to get a first sum $\log_2(K_2|G-G_0|/W)$ and a second sum $\log_2(K_1/W)$;
  limiting the first and second sums to a predetermined range of integer values; and
  selecting the greater of the first sum and the second sum as the texture map gradient.

Preferably, these steps are repeated for each coordinate direction represented by the texture value. In addition, the steps of determining the $\log_2$ of respective values are preferably performed by converting an input value into a binary number in the form of exponent-.mantissa, where the mantissa is determined by shifting the binary input value to the left until a one is to the left of the radix point, which is discarded to leave only the fractional part. The exponent corresponds to a binary representation of the number of shifts and becomes the integer part. A binary one is then added to the fourth fractional bit of the mantissa of the binary number (i.e., $0.0001_2$ is added).

The apparatus for performing the method of calculating at least one texture map gradient at each display point to be displayed on a display device in accordance with the invention preferably comprises a transform engine and a gradient calculating circuit. In accordance with the invention, the transform engine provides polygon vertex data for each vertex of an input polygon to be displayed, where the polygon vertex data includes at least one texture value G and one perspective value W for display points corresponding to each vertex. The transform engine also calculates constants $G_0$, $K_1$ and $K_2$ for each polygon. The gradient calculating circuit, on the other hand, directly calculates from the perspectively interpolated texture value G, the linearly interpolated perspective value W and the constants $G_0$, $K_1$ and $K_2$, the at least one texture map gradient for each display point of the particular input polygon. In addition, the apparatus of a preferred embodiment of the invention preferably comprises a perspective interpolator which interpolates the polygon vertex data in perspective space to account for the effects of perspective foreshortening on the displayed texture values. From the calculated texture map gradient values, addresses to a texture map are determined, the texture map storing a predetermined number of filtered texture values which are accessed in accordance with the at least one texture map gradient.

The above-mentioned features of the invention are particularly useful in that the gradient of the texture map parameters may be determined at each pixel of the image to be displayed using only polygon vertex information, even in an environment where the texture values vary nonlinearly within an input polygon. The calculations in accordance with the invention are thus much more efficient and accurate than heretofore implemented in hardware. Moreover, processing efficiency is enhanced since the more time consuming portions of the gradient calculations need only be done once per polygon.

BRIEF DESCRIPTION OF THE DRAWINGS

The objects and advantages of the invention will become more apparent and more readily appreciated from the following detailed description of the presently preferred exemplary embodiment of the invention taken in conjunction with the accompanying drawings of which.

DETAILED DESCRIPTION OF THE PRESENTLY PREFERRED EMBODIMENT

The inventors of the subject matter disclosed and claimed herein have satisfied the above-mentioned long-felt needs in the art by developing a method and apparatus for calculating texture map gradients in perspective space using only the polygon vertex information rather than the adjacent pixel information as in the prior art. In particular, a hardware implementation is disclosed for calculating perspectively scaled texture map gradients which may be used for addressing a texture map to determine the filtered texture values for respective pixels to be displayed on the display screen. For example, the interpolated gradient values determined in accordance with the invention may be used to address a RIP map of the type disclosed in the above-mentioned copending application Ser. No. 07/494,706. However, the techniques in accordance with the invention may also be used to address MIP maps of the type disclosed by Williams, for example.

A device with the above and other beneficial features in accordance with a presently preferred exemplary embodiment of the invention will be described below with reference to FIGS. 1-3. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

Figure 1:
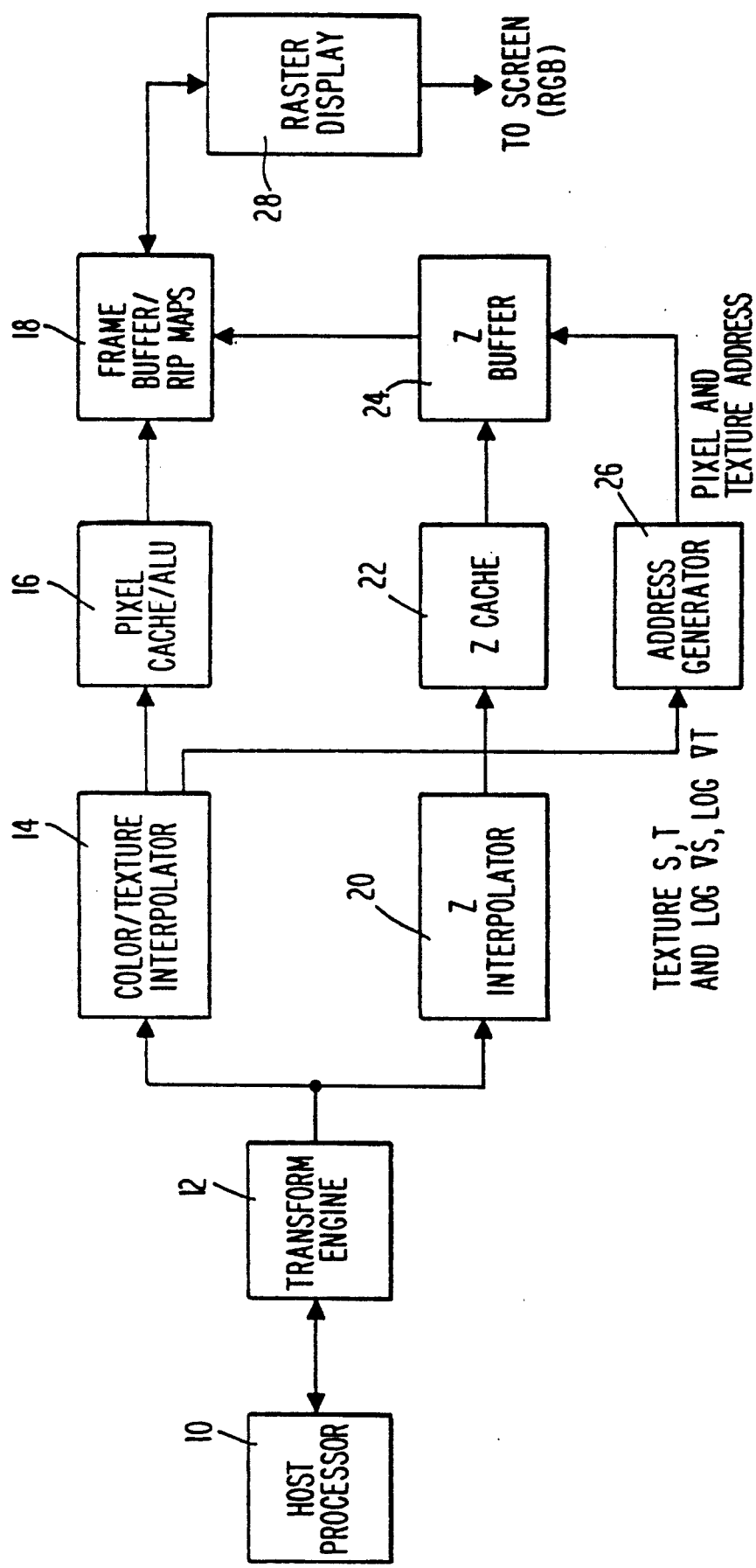
FIG. 1 schematically illustrates a graphics pipeline architecture including a gradient interpolator and means for accessing a texture map in accordance with the invention.

Before a description of the texture mapping implementation in accordance with the invention is given, a general description of the graphics pipeline will be provided with respect to FIG. 1.

FIG. 1 shows a generalized block diagram of a graphics pipeline including a texture map gradient interpolation system in accordance with the invention. The graphics pipeline of FIG. 1 includes a host processor 10 which performs display list traversal and preferably contains a high performance central processing unit, a cache memory, a system memory, a bus adapter and a graphics interface. Host processor 10 runs on a known operating system and uses existing graphics libraries to provide a user with access to the graphics processing software. Host processor 10 also transfers commands and data (including textures) to the downstream hardware as the display list is traversed.

The commands and data are first received by the transform engine 12, which performs the known graphics processing tasks of viewing transforms, lighting calculations, clipping and the like. The transformed data is then rasterized by a color/texture interpolator 14 and a Z interpolator 20. The color/texture interpolator 14 simultaneously interpolates a large number of pixel parameters such as $RGB_{specular}$, $RGB_{diffuse}$, $\alpha$, x, y, s and t as described in the aforementioned copending application Ser. No. 07/493,189 and then performs gradient calculations in accordance with the invention. The processed data is then passed to pixel cache/ALU 16, where gamma correction, dithering, Z compares and blending of pixel color values with data previously stored in frame buffer 18 are performed. These and other functions of the pixel cache/ALU 16 are described in copending application Ser. No. 07/495,005 filed Mar. 16, 1990, now U.S. Pat. No. 5,185,856 assigned to the assignee of this invention and hereby incorporated herein by reference in its entirety. Z interpolator 20, on the other hand, only interpolates the x, y and z values of the display screen and temporarily stores the processed values in Z cache 22 before providing the interpolated values to Z buffer 24.

Frame buffer 18 stores the processed image data from pixel cache/ALU 16 which is to be displayed on the display screen. In a preferred embodiment, frame buffer 18 consists of 24 planes of 2048×1024 video RAMs of which 1280×1024 pixels are displayed. In such an embodiment, there are eight planes of each of red, green and blue. The off-screen frame buffer 18 also may be used for texture storage, font storage, retained raster storage, and for storing information used by the window system of the graphics processing system. The frame buffer 18 also preferably includes RIP or MIP maps therein which are addressed by address generator 26 in accordance with the techniques herein described. Finally, the contents of the frame buffer 18 are output to raster display device 28 for rendering the red, green and blue colors of the processed image to the display screen.

The texture map implementation of the invention will now be described with reference to FIGS. 1-3.

In host processor 10, up to 16 textures in a preferred embodiment can be defined simultaneously. Preferably, the texture mapping implementation of the invention uses RIP pre-filtered textures as described in the aforementioned copending application Ser. No. 07/494,706 or point-sampled textures stored in off-screen frame buffer memory 18. A texture defined by the host processor 10 must be downloaded into the frame buffer 18 before it is used, and the host software preferably manages the frame buffer 18 so that the number of textures transferred is minimized. The textures may then be accessed as will be described in detail below.

The s and t values provided at each vertex of an input polygon defined by host processor 10 specify the portion of the texture which is to be rendered on a primitive. The s and t values correspond to a mapping that is actually used to index the texture in the texture map; however, it is also possible for host processor 10 to define a mapping of the textures in a first coordinate system before the textures are then mapped from that space to the s,t space by which the texture map is indexed. In any event, the user should perceive only that the texture repeats infinitely in the coordinate plane of the texture.

In transform engine 12, the texture mapping works at a polygonal level. As described in the aforementioned copending application Ser. No. 07/493,189 the s and t parameters may be interpolated correctly for each point of the polygon in perspective space in color/texture interpolator 14, and if a pre-filtered texture is used as in the present application, the gradients $\nabla s$ and $\nabla t$ of the textures with respect to the polygon rendered in screen space also may be calculated at each pixel. As will be described below, the gradients $\nabla s$, $\nabla t$ are then used to determine which of the pre-filtered versions of the texture to use with each pixel of the input polygon. As will also be described below, the tasks of determining the gradients $\nabla s$ and $\nabla t$ are divided between the transform engine 12 and the color/texture interpolator 14.

Figure 2:
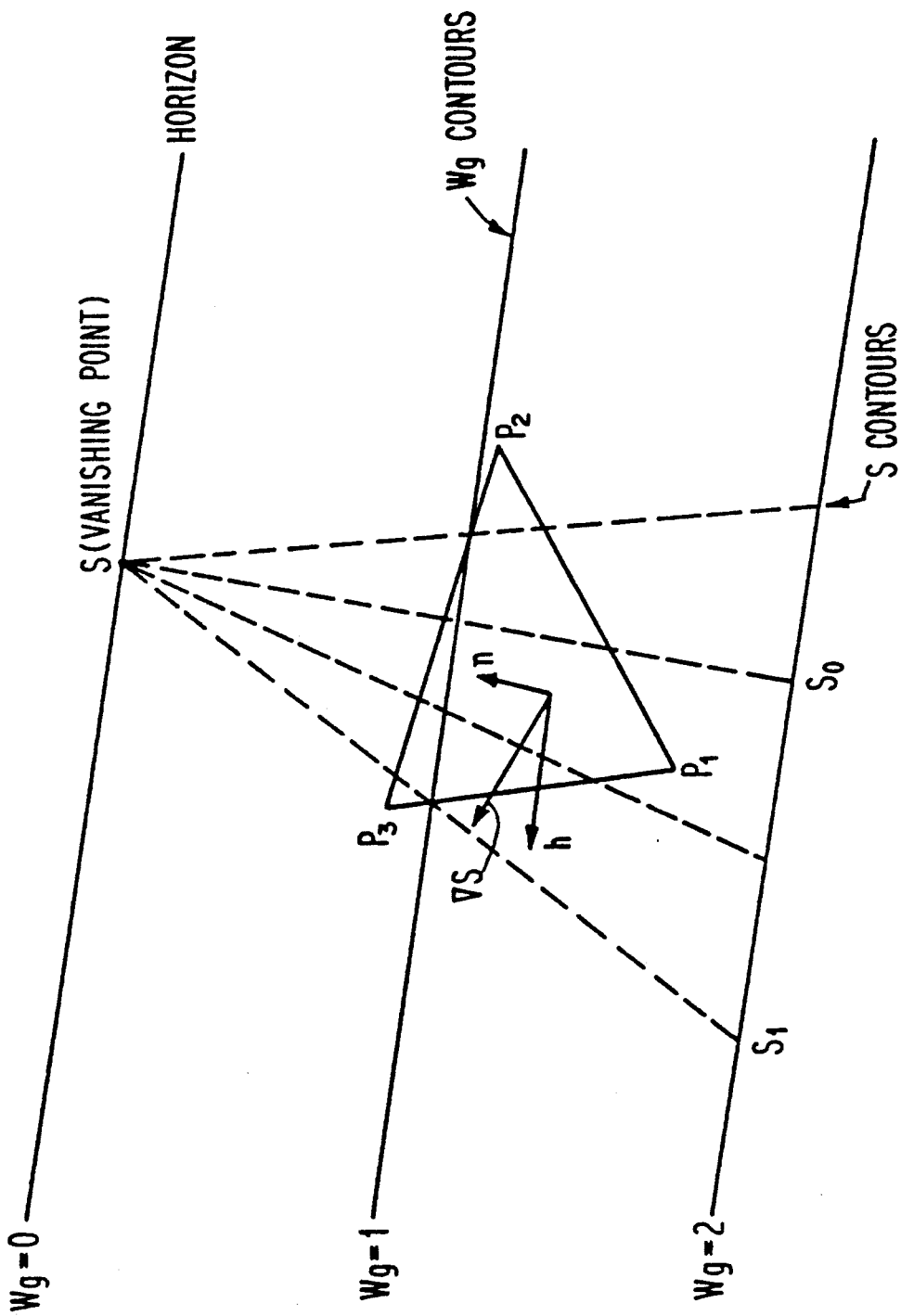
FIG. 2 illustrates a texture mapped triangle in perspective space for illustrating the effects of perspective forshortening on a texture mapped image.

In the color/texture interpolator 14, the texture gradient is represented by a pair of orthogonal vectors h and n, one parallel to the texture horizon (h) and one normal to it (n) as shown in FIG. 2. The h component is proportional to the distance a particular point is from the horizon, while the n component is a function of the slope of the equal contours of s and t values on the polygon. Contours of s for a triangle $P_1P_2P_3$ are shown in FIG. 2. As will be described below, these relationships can be expressed in terms of three constants each for s and t, which are calculated in transform engine 12 and passed to the color/texture interpolator 14 for calculating the texture gradients.

The values of s, t, $\nabla s$ and $\nabla t$ output by color/texture interpolator 14 are then output to address generator 26, which calculates the texture addresses for each pixel in perspective correct space for addressing the texture maps of frame buffer 18 to determine the proper filtered texture parameter for each pixel. The s and t values are the texture coordinates at the center of the pixel in screen space, While the gradient values $\nabla s$ and $\nabla t$ are approximations of the area in texture space that is covered by the pixel. Other perspective correct parameters such $RGB_{diffuse}$ and $RGB_{specular}$ are also generated by the color/texture interpolator 14 and passed to the pixel cache/ALU 16. The RIP maps stored in frame buffer 18 are sampled by accessing the frame buffer memory at the address calculated by the address generator 26. The texture color is then read into the pixel cache/ALU 16 to be combined with the light source color data provided from transform engine 12, and the result is written back to the frame buffer 18. The image with the appropriate texture values is then outputted to raster display device 28 for display.

As noted above, frame buffer 18 may use MIP maps, RIP maps or some other texture map for storing the pre-filtered textures. However, RIP maps are presently preferred since multiple versions of a texture created by down-sampling the original texture may be created independently in the s and t dimensions. Moreover, RIP maps allow a textured pixel to be mapped to a rectangular area in the texture map, thereby allowing for more accurate mapping of textures onto surfaces where filtering is required along only one dimension. This improves upon the prior art problems of blurring associated with filter symmetry. For a more detailed description of RIP maps, the reader is referred to the aforementioned copending application Ser. No. 07/494,706.

As described in the aforementioned copending application Ser. No. 07/493,189, perspective interpolation between vertices may be accomplished in the color/texture interpolator 14. In particular, the s and t parameters provided to the interpolator for each vertex are interpolated to provide the corresponding s and t values for each pixel on the polygon of the image in perspective (screen) space to be displayed. Then, the interpolated pixels are preferably rendered in scan line order, and during texture mapping the values of $RGB_{specular}$, $RGB_{diffuse}$, s, t, $\nabla s$ and $\nabla t$ are preferably calculated for each pixel. The information at the vertices of the polygon is thus sent to the color/texture interpolator 14 for processing as each scan line is rendered.

The calculation of the texture gradients will now be described with reference to FIGS. 2 and 3.

In order to define the texture on an input polygon such as the triangle in screen space shown in FIG. 2, the s and t values must be interpolated across the polygon. The equation for determining the s values on an edge of a polygon is:

$$s = s_1 + p(s_2 - s_1) \qquad \text{Eq. (1)}$$

The same equation holds for the t values along the edge of the polygon. If all of the perspective values W are the same for each vertex of the triangle of FIG. 2, the triangle is parallel to the screen and the s and t gradients are constant over the whole triangle. On the other hand, if all of the perspective W values are not the same, the triangle defines a larger plane which has an horizon as shown in FIG. 2. In the latter case, lines of constant s and t converge at two points on the horizon unless the s or t lines are parallel to the horizon. The respective gradients for s and t are perpendicular to the constant line. Hence, in perspective space the overall texture gradient may be expressed as the vector sum of two perpendicular components- one parallel to the horizon (h) and one perpendicular to it (n). The parallel component is constant along lines of constant W and varies with 1/W, where at W=1 the gradient is equal to the pre-perspective gradient and is constant in pre-perspective space. On the other hand, the normal component, which is perpendicular to the horizon, is most conveniently determined by the relation that the projection of the gradient onto a direction is the directional derivative in that direction. In other words, $\nabla_n S = \nabla_h S * 1/m$, where $1/m$ is the slope of the line of constant s. The same is also true for the t component.

To interpolate the s and t values along the edges of the input polygon, a unit rotation vector may be defined which translates coordinates x,y to coordinates e,f, where e is the direction coincident with an edge of the polygon and f is perpendicular to an edge of the polygon. As a result, the perspective value p can be rewritten in terms of e and f as:

$$p = \frac{W_1(e - e_1)}{W_1(e - e_1) + W_2(e_2 - e)} \qquad \text{Eq. (2)}$$

In other words, by taking the derivative of Equation (1) at point $P_1$ with p as expressed in Equation (2), the following results:

$$\left.\frac{ds}{de}\right|_p = \frac{W_2}{W_1}\left[\frac{s_2 - s_1}{e_2 - e_1}\right], \qquad \text{Eq. (3)}$$

where ds/de is on a line where s is perspective interpolated between the values at the endpoints $P_1$ and $P_2$. Since $e_2 - e_1$ is the distance from point $P_1$ to $P_2$, then:

$$\left.\frac{ds}{de}\right|_p = \frac{W_2}{W_1}\left[\frac{s_2 - s_1}{[(x_2 - x_1)^2 + (y_2 - y_1)^2]^{\frac{1}{2}}}\right] \qquad \text{Eq. (4)}$$

Equation 4 represents an expression for the directional derivative or the gradient of s ($\nabla s$) in the direction e at point $P_1$. A similar technique may be used to calculate the directional derivative or the gradient of t ($\nabla t$) in the direction e at point $P_1$.

At two different pairs of vertices of the input polygon, expressions can be written for the gradient of s or t in matrix form and expressed as components of x and y by taking the projection of $\nabla s$ on the corresponding sides of the polygon having endpoints $P_1$, $P_2$ and $P_1$, $P_3$, respectively. The result is shown below for s but can be similarly done for t:

$$\begin{bmatrix} X_2 - X_1 & Y_2 - Y_1 \\ X_3 - X_1 & Y_3 - Y_1 \end{bmatrix}\begin{bmatrix} ds/dx \\ ds/dy \end{bmatrix} = \begin{bmatrix} W_2/W_1 \ (s_2 - s_1) \\ W_3/W_1 \ (s_3 - s_1) \end{bmatrix} \qquad \text{Eq. (5)}$$

Using this formulation, the gradient $\nabla s$ or $\nabla t$ at any vertex in the polygon can be calculated in the transform engine 12. What remains to be described is a methodology for calculating the gradient at any point in the interior of the polygon. This will be described with further reference to FIG. 2.

Assuming a linear mapping of the texture on the surface of the polygon in pre-perspective space and assuming that the third and fourth columns of the transformation matrix (Equation (5)) are linearly related, a texture mapped triangle in perspective space would appear as shown in FIG. 2. Since the texture is linearly mapped in pre-perspective space, the contours of equal s values will be parallel lines as noted above. However, in perspective space these contours will converge at a vanishing point as shown in FIG. 2. By also defining a linear perspective contour space $W_g$ inversely proportional to W, contour lines $W_g$ as shown in FIG. 2 result. As shown, the contour line $W_g=0$ corresponds to the horizon since $1/W=0$ when W is infinity. Other contour lines are also shown in FIG. 2 for $W=1$ and $W=\frac{1}{2}$.

As noted above, the texture gradients $\nabla s$ and $\nabla t$ at any point in the triangle defined by vertices $P_1$, $P_2$ and $P_3$ may be described by a set of vectors, one parallel to the $W_g$ contours (h) and one perpendicular to the $W_g$ contours (n). Since the $W_g$ contours are linear and parallel to the horizon, then the h component can be expressed as $h=K_1*W_g=K_1/W$, where $K_1$ is a constant. (This equation still holds if s is parallel to the horizon since the derivative of s would be 0.) The gradient $\nabla s$ at any point will thus be perpendicular to the contour of s at that point. Also, since its projection on h is ds/dh at that point, the component normal to the horizon (on n) can be expressed in terms of the slope of the contour with respect to the horizon and ds/dh as: $ds/dn = 1/m * ds/dh$, where m is the slope of the s contour. However, since the slope is constant on a constant W line, 1/m is linearly proportional to the distance on W from some $h_0$ which is directly under the vanishing point. Since s is also linearly related to the distance from this point, 1/m may be expressed in the form: $(s-s_0)/(s_1-s_0)$, where $s_0$ is the contour perpendicular to the horizon and $s_1$ is the contour with a slope of 1 as shown in FIG. 2. Hence, by substitution:

$$\frac{ds}{dn} = \frac{s-s_0}{s_1-s_0} \cdot \frac{ds}{dh} = \frac{K_2}{W} \cdot (s-s_0) \qquad \text{Eq. (6)}$$

where $K_2=K_1/(s_1-s_0)$. Equation (6) also holds if s is parallel to the horizon.

In addition, since the s contours are divided equally at a $W_g$ contour line, the n component may be expressed as:

$$n = \frac{s-s_0}{s_1-s_0} \cdot \frac{K_1}{W_g} \qquad \text{Eq. (7)}$$

Then, the gradient $\nabla s$ at any point in the input polygon can be expressed as:

$$|\nabla s| = 1/W_g * [K_1^2+(K_2(s-s_0))^2]^{\frac{1}{2}} \qquad \text{Eq. (8)}$$

Equation (8) will work for the degenerate case where the s contours are parallel to the horizon, but as the polygon becomes parallel to the screen, the gradient of s is treated as a constant. $Log_2 (\nabla s)$ is needed to select the appropriate part of the RIP map as described in the aforementioned copending application Ser. No. 07/494,706. Accordingly, when RIP maps are addressed, only the integer portion of $\log_2(\nabla s)$ is required. As a result, $\nabla s$ only needs to be accurate enough to determine the leftmost bit position set. Thus, Equation (8) may be approximated within the necessary degree of accuracy as the maximum of $\log_2 [K_2(s-s_0)/W]$ and $\log_2 (K_1/W)$.

Accordingly, the gradients of s and t may be expressed for two vertices of a polygon using Equation (8). Equation (8), and hence the calculation of the gradients of s and t, may be simply implemented in hardware as described below with respect to FIG. 3. To perform this calculation, all that remains is the description of the calculation of constants $K_1$, $K_2$ and $s_0$. The calculation of these constants and the hardware implementation of Equation (8) will now be described with respect to FIG. 3.

Figure 3:
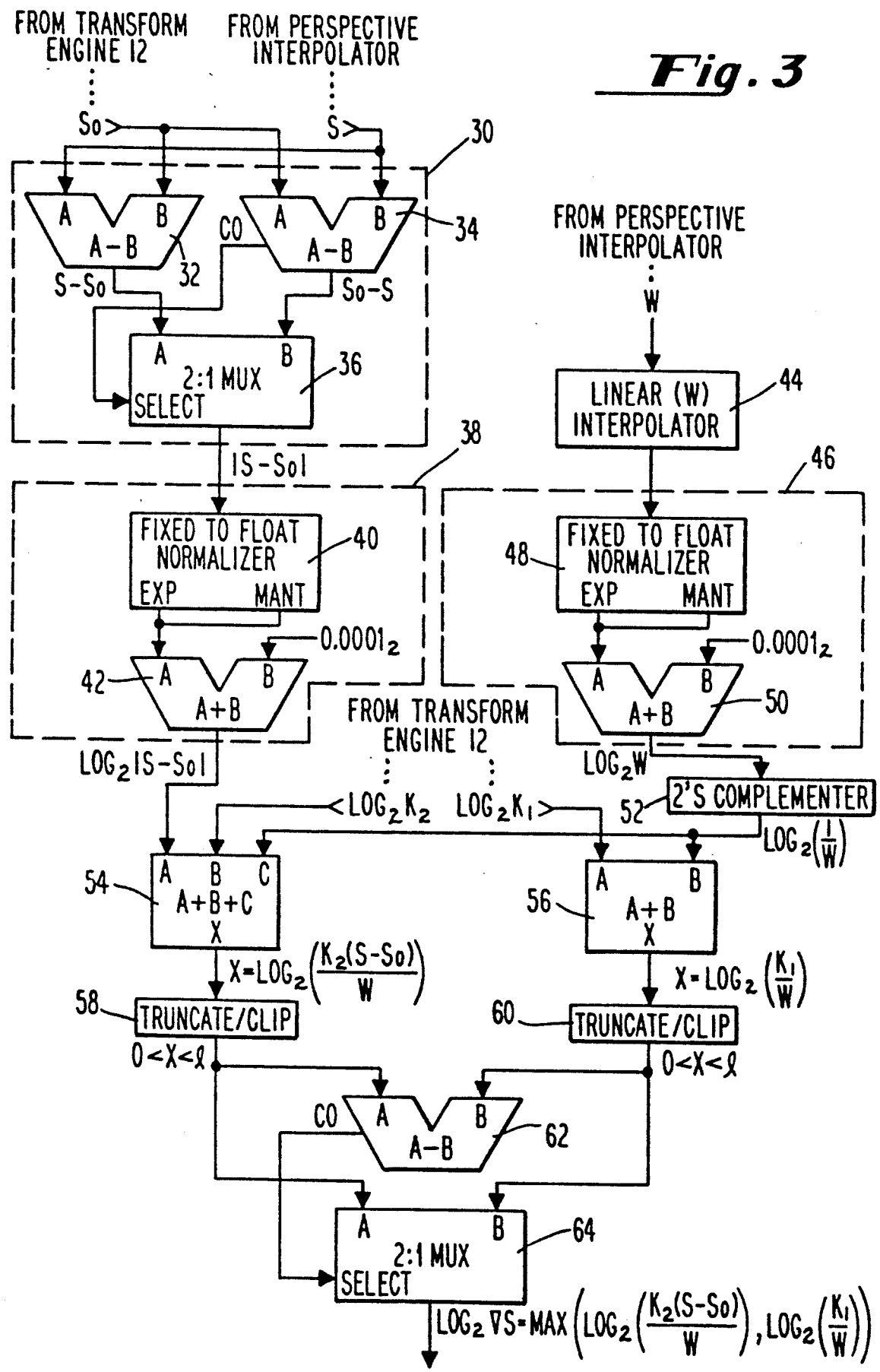
FIG. 3 schematically illustrates a circuit for calculating texture map gradients in perspective space in accordance with the invention.

As shown in FIG. 3, the value $s_0$ determined by transform engine 12 is provided as a first input to absolute value circuit 30. The interpolated value for s at a particular pixel is input from the perspective interpolator as a second input to the absolute value circuit 30. Absolute value circuit 30 contains difference circuits 32 and 34 which respectively calculate $s-s_0$ and $s_0-s$. Two to one multiplexer 36 then selects the output having a positive value as the absolute value of $s-s_0$. The absolute value of $s-s_0$ is then input into $\log_2$ circuit 38, which calculates $\log_2 |s-s_0|$. Log values are preferably used in order to avoid multiplications, thereby increasing the speed of the circuitry. The log value is calculated by $\log_2$ circuit 38 by representing the input value of $s-s_0$ in binary form as a binary exponential value e and a binary mantissa value m in the form of eeee.mmmm and then adding a binary "1" to the mantissa value. For example, if the absolute value of $s-s_0$ is 5 (binary 101), the mantissa would be 1.0100 and the exponent would be 10. In other words, fixed to float normalizer 40 shifts the binary representation of the input number to the left until a "1" is to the left of the radix point, which is discarded to leave only the fractional part as the mantissa. The number of shifts corresponds to the exponent, which becomes the integer part. Thus, the value output by fixed to float normalizer 40 would be 0010.0100 (i.e., eeee.mmmm). A binary "1" ($0.0002_2$) is then added to the mantissa at adder 42 so that the result approximates the $\log_2$ of $s-s_0$, which for the example given would be $\log_2(5)=0010.0101$. This value is applied as a first input into adder 54.

The perspective value W received from the perspective interpolator is input into a linear interpolator 44 for determining the W value at a particular pixel. Since W is the parameter which controls the nonlinearity of the perspective interpolation, the W value must be linearly interpolated. The $\log_2$ of W is then determined in $\log_2$ circuit 46 using fixed to float normalizer 48 and adder 50 in the same manner as described above with respect to $\log_2$ circuit 38. The resulting value ($\log_2(W)$) is then inverted in two's complementer 52 in order to calculate $\log_2(1/W)$. This value is then input as a second input into adder 54 and a first input into adder 56.

$Log_2(K_2)$ from transform engine 12 and $\log_2(K_1)$ from transform engine 12 are then respectively input as a third input into adder 54 and a second input into adder 56 as shown. These values are different for s and t. The sums of adders 54 and 56 are then respectively input into truncate/clip circuits 58 and 60 for limiting the sums so as to be within a given range such as $L=15$. In other words, since the RIP maps are finite, only a limited number of bits may be shifted, such as 15 in this example. Other ranges are of course possible as the number of values stored in the texture map varies. Truncate/clip circuits 58 and 60 also eliminate fractions since the RIP map in a preferred embodiment can only be addressed by integers, although non-integer tables could be used for more accurate filtering as would be apparent to one skilled in the art. The truncate/clip circuits 58 and 60 thus chop off fractions to limit the output to the range $0<x<L$. The outputs of truncate/clip circuits 58 and 60 are then compared at subtractor 62, and 2:1 multiplexer 64 selects the greater value. In other words, 2:1 multiplexer 64 selects the maximum of $\log_2(K_2|s-s_0|/W)$ and $\log_2(K_1/W)$. As described above, this is a reasonable approximation to the value of Equation (8) for determining the gradient of s or t to within an integer value. On the other hand, more accuracy may be attained by doing an addition in the integer domain of the outputs of truncate/clip circuits 58 and 60 in order to directly calculate Equation (8). Such an additional computation may be performed by one skilled in the art but is not necessary in a preferred embodiment of the invention since the output of multiplexer 64 is accurate to within the square root of 2, which is sufficient for addressing purposes.

The calculation of coefficients $K_1$ and $K_2$ and constant $s_0$ will now be described.

As noted above, vectors n and h are defined as the unit vectors normal and parallel to the horizon, respectively, for an input polygon to be texture mapped. Thus, the gradient vectors at any point may be decomposed into components along these axes. For example, when multiplied by W, the h component is defined as $K_1$. The difference between two n components divided by the corresponding s difference is similarly defined as $K_2/s_1-s_0$. Hence, as described above, $K_2 = K_1/s_1-s_0$. Accordingly, $K_1$ and $K_2$ may be found by a simple algebraic manipulation of the n components and the s values.

Transform engine 12 generates constant $K_1$, $K_2$ and $s_0$ (and $t_0$ and different $K_1$ and $K_2$ values for the t gradient) using the following algorithm for any input polygon. For ease of description, the calculation will be described for the triangle of FIG. 2.

For the triangle defined by points $P_1$, $P_2$, and $P_3$, where x, y, W, s and t are defined at each point P, the gradient equations may be written for each point in the triangle. The first step is to evaluate the determinant D of the x,y matrices of any vertex within the triangle. This is done by calculating $A=(x_2-x_1)*(y_3-y_1)$ and $B=(x_3-x_1)*(y_2-y_1)$, where $D=A-B$. If the absolute value of D is very small, then points $P_1$, $P_2$ and $P_3$ are determined to be collinear to the extent that no pixels are likely to rendered anyway. For such a case, the triangle may be ignored or the values of $K_2$ and $s_0$ may be set equal to 0, $K_1=2^{10}$ and $W=1-2^{12}$ (all ones).

For the case in which the gradient of s is a constant, $$\nabla S_x = [(s_2-s_1)*(y_3-y_1)-(s_3-s_1)*(y_2-y_1)]/D \quad \text{Eq. (9)}$$

$$\nabla S_y = [(x_2-x_1)*(s_3-s_1)-(x_3-x_1)*(s_2-s_1)]/D \quad \text{Eq. (10)}$$

and $$K_1 = (\nabla S_x^2 - \nabla S_y^2)^{\frac{1}{2}} \quad \text{Eq. (11)}$$

For this case, $K_2=0$, $s_0=0$ and $W=1-2^{12}$ (all ones).

When the points of the polygon are expressed in perspective space, the coefficients may be calculated for all vertices by taking the two vertices with the largest $\Delta s$ between them and using the associated values to calculate $W\Delta s$ at both vertices. If $W_1\Delta s_1 - W_2\Delta s_2$ in the x and y coordinate directions for the two points is minimal, then $W\Delta s$ is essentially constant over the whole polygon, and accordingly, $K_2=s_0=0$ and:

$$K_1 = [(W_1\Delta s_{1x})^2 + (W_2\Delta s_{1y})^2]^{\frac{1}{2}} \quad \text{Eq. (12)}$$

If $W_1\Delta s_1 - W_2\Delta s_s$ in the x and y coordinate directions for the two points is not minimal, $K_2$ is defined as:

$$K_2 = \frac{[(W_1\Delta s_{1x} - W_2\Delta s_{2x})^2 + (W_1\Delta s_{1y} - W_2\Delta s_{2y})^2]^{\frac{1}{2}}}{s_1 - s_2} \quad \text{Eq. (13)}$$

Equation (13) may be approximated as the maximum of $(W_1\Delta s_{1x})/(s_1-s_2)$ and $(W_2\Delta s_{2x})/(s_1-s_2)$. $K_1$ and $s_0$ may then be calculated from the n and h vectors, where:

$$n = \frac{W_1\Delta s_1 - W_2\Delta s_2}{|W_1\Delta s_1 - W_2\Delta s_2|} = ax + by \quad \text{Eq. (14)}$$

and $h = -by + ax$, where x and y are vectors. Thus, $$K_1 = W_1\Delta s_1 \cdot h \text{ and} \quad \text{Eq. (15)}$$

$$s_0 = s - (1/K_2)*(W_1\Delta s_1 - n) \quad \text{Eq. (16)}$$

$K_1$ and $K_2$ may also be normalized for W if desired. The resulting values for $s_0$, $K_1$ and $K_2$ are then input into the circuit of FIG. 3 as shown. Of course, the same procedure is followed for the t value.

As noted above, the output of the circuit of FIG. 3 is used to address the texture map stored in frame buffer 18. The addresses are calculated for the s and t texture values for textures with a predetermined number of values in each dimension. The s and t texture values must be truncated to the size of the texture, especially when the texture repeats across a surface. In other words, allowing s and t to exceed the size of the texture and then truncating the s and t values causes the texture to repeat. As a result, only one copy of the texture needs to be stored in the frame buffer 18.

The next step in generating the texture map address is to determine which map to use, the original map or one of the many down-sampled versions as in the case of RIP maps and MIP maps. For example, the $\log_2 \nabla s$ or $\log_2 \nabla t$ value calculated in accordance with the invention may be used to shift 1's into the sort texture values starting one bit to the left of the most significant bit of the s or t value after truncation. A mask may then be applied to clear the upper bits of the s or t values, and the modified values become the s and t offsets into the texture map. By adding the texture map origin to the offset, the frame buffer memory address of the texture value may be determined. Further details regarding this procedure may be found in the aforementioned copending application 07/494,706.

The hardware implementation described above with respect to FIG. 3 allows the performance of the present invention to be significantly faster than a software only solution, while also providing images that are perspectively correct. Processing efficiency is further increased in that the texture gradients may be calculated without requiring the data at adjacent pixels about a particular point in an input polygon to be stored for use in the calculation. Rather, the values are determined iteratively using values that need only be determined once per polygon and then interpolating for all points. Moreover, the technique of the invention allows artifacts in the image to be removed without increasing cost or reducing speed. Furthermore, the gradients of s and t may be calculated at each pixel of the input polygon from polygon vertex information only even in an environment where s and t vary nonlinearly within the input polygon. The technique of the invention also has the benefit that it may be implemented in software or hardware as desired by the designer in order to meet throughput limitations.

Although an exemplary embodiment of the invention has been described in detail above, those skilled in the art will readily appreciate that many additional modifications are possible in the exemplary embodiment without materially departing from the novel teachings and advantages of the invention. For example, the present application allows for texturing of diffuse RGB values; however, other parameters that are useful to texture such as $\alpha$ (transparency), x, y, z values (displacement mapping), x, y, z normals (bump mapping) and in general any parameter found in the surface description or lighting equation may be calculated. In addition, although only the mapping of two-dimensional textures to three-dimensional objects have been described herein, three-dimensional textures such as marble, clouds, wood, and the like may also be mapped to three-dimensional objects in accordance with the invention. Also, the present invention may be used in a rendering system in which the image is rendered directly as a curve rather than as a plurality of polygons by choosing particular sampling points on the representative curve as the representative points (instead of polygon vertices) for interpolating between. Furthermore, the invention can be used to interpolate the gradient within a sub-area of a polygon, e.g., within a horizontal scan line, from scan line endpoint values (intersections with polygon edges) and samples of s and t at points within the polygon other than vertices. Accordingly, all such modifications are intended to be included within the scope of this invention as defined in the following claims.

We claim:

1. A method of displaying textured images on a display device, comprising the steps of:

storing texture data in a texture memory at predetermined texture addresses;

representing an image to be displayed as a plurality of polygons projected onto said raster display device, said polygons being represented by intensity values of respective vertices of said plurality of polygons;

providing texture values and said intensity values for respective vertices of an input polygon;

determining the intensity values of each intermediate pixel in said input polygon directly from the intensity values of the respective vertices of said input polygon by interpolating the intensity values of the respective vertices of said input polygon;

determining texture map gradients at each intermediate pixel in said input polygon directly from said texture values of the respective vertices of said input polygon by calculating the absolute value of a texture map gradient $\nabla G$ for each pixel of said input polygon using a texture value G at a pixel of said input polygon in accordance with the equation:

$$|\nabla G| = 1/W * (K_1^2 + (K_2(G-G_0))^2)^{\frac{1}{2}}$$

where:

W is an interpolated perspective value of said pixel having texture value G;

$G_0$ is a texture value of a point where a vector normal to a plane of the input polygon intersects a predetermined viewpoint of the input polygon;

$K_1 = W*h$, where h is a vector parallel to a W contour line in which W has a constant value over the input polygon; and $K_2 = K_1/(G_1-G_0)$, where $G_1$ is a texture value where the slope of a G contour line in which G has a constant value over the input polygon is one;

addressing said texture memory at a texture address specified by said texture values and said texture map gradients at each pixel in said input polygon;

reading the texture data at said texture address;

combining said read texture data for each pixel of said input polygon with the intensity values for the corresponding pixel of said input polygon to get textured intensity data for each pixel of said input polygon; and providing the textured intensity data to said raster display device for display at predetermined display coordinates thereof.

2. A method as in claim 1, wherein said step of determining the intensity values of each intermediate pixel in said input polygon includes the step of interpolating the intensity values of the respective vertices of said input polygon in accordance with perspective projection values representing the nonlinear effects of perspective foreshortening on said input polygon in a display plane of said raster display device at said respective vertices of said input polygon.

3. A method as in claim 1, wherein said texture map gradients determining step includes the steps of:

once for said input polygon, determining $G_0$, $\log_2 (K_1)$ and $\log_2 (K_2)$;

determining, by perspective interpolation, a value of G for said pixel of the input polygon using values of G at vertices of the input polygon;

determining $\log_2 |G-G_0|$;

determining a value of W for said pixel of the input polygon by linear interpolation;

determining $\log_2(1/W)$;

adding $\log_2 |G-G_0|$, $\log_2(1/W)$, $\log_2(K_1)$ and $\log_2(K_2)$ to get a first sum $\log_2(K_2|G-G_0|/W)$ and a second sum $\log_2(K_1/W)$;

limiting said first and second sums to a predetermined range of integer values; and selecting the greater of said first sum and said second sum as said texture map gradient $|\nabla G|$.

4. A method as in claim 3, comprising the further step of repeating said texture map gradients determining step for each coordinate direction represented by said texture values.

5. A method as in claim 3, wherein said steps of determining $\log_2 |G-G_0|$ and $\log_2(1/W)$ respectively comprise the steps of:

converting an input value into a binary number in the form of exponent.mantissa, where the mantissa is determined by shifting the binary input value to the left until a one is to the left of the radix point and retaining the fractional part as the mantissa, while the exponent corresponds to a binary representation of the number of said shifts; and adding a binary one to a fourth fractional bit of said mantissa of said binary number.

6. A graphics display system for displaying textured images on a raster display device, comprising:

a texture memory for storing texture data at predetermined texture addresses;

means for representing an image to be displayed as a plurality of polygons projected onto said display device, said polygons being represented by intensity values of respective vertices of said plurality of polygons;

a transform engine for providing texture values and said intensity values for respective vertices of an input polygon;

a color interpolator for determining the intensity values of each intermediate pixel in said input polygon directly from the intensity values of the respective vertices of said input polygon by interpolating the intensity values of the respective vertices of said input polygon;

a texture interpolator for determining texture map gradients at each intermediate pixel in said input polygon directly from said texture values of the respective vertices of said input polygon by calculating the absolute value of a texture map gradient $\nabla G$ for each pixel of said input polygon using a texture value G at a pixel of said input polygon in accordance with the equation:

$$|\nabla G| = 1/W * (K_1^2 + (K_2(G-G_0))^2)^{\frac{1}{2}}$$

where:

W is an interpolated perspective value of said pixel having texture value G;

$G_0$ is a texture value of a point where a vector normal to a plane of the input polygon intersects a predetermined viewpoint of the input polygon;

$K_1 = W*h$, where h is a vector parallel to a W contour line in which W has a constant value over the input polygon; and $K_2 = K_1/(G_1 - G_0)$, where $G_1$ is a texture value where the slope of a G contour line in which G has a constant value over the input polygon is one;

an address generator for generating a texture address for addressing said texture memory, said texture address being determined from said texture values and said texture map gradients at each pixel in said input polygon;

means for combining texture data at said texture address in said texture memory for each pixel of said input polygon with the intensity values for the corresponding pixel of said input polygon to get textured intensity data for each pixel of said input polygon; and said raster display device providing the textured intensity data to said raster display device for display at predetermined display coordinates thereof.

7. A graphics display system as in claim 6, wherein said color interpolator determines the intensity values of each intermediate pixel in said input polygon by interpolating the intensity values of the respective vertices of said input polygon in accordance with perspective projection values representing the nonlinear effects of perspective foreshortening on said input polygon in a display plane of said raster display device at said respective vertices of said input polygon.

8. A graphics display system as in claim 6, wherein said texture interpolator includes:

means for determining $G_0$, $\log_2(K_1)$ and $\log_2(K_2)$ once for said input polygon;

means for determining a value of G for said pixel of the input polygon using values of G at vertices of the input polygon;

means for determining $\log_2 |G-G_0|$;

a perspective interpolator for determining a value of W for said pixel of the input polygon by linear interpolation;

means for determining $\log_2(1/W)$;

an adder for adding $\log_2 |G-G_0|$, $\log_2(1/W)$, $\log_2(K_1)$ and $\log_2(K_2)$ to get a first sum $\log_2(K_2|G-G_0|/W)$ and a second sum $\log_2(K_1/W)$;

means for limiting said first and second sums to a predetermined range of integer values; and means for selecting the greater of said first sum and said second sum as said texture map gradient $|\nabla G|$.

9. A graphics display system as in claim 8, wherein said means for determining $\log_2 |G-G_0|$ and $\log_2(1/W)$ respectively comprise a fixed to float normalizer for converting an input value into a binary number in the form of exponent.mantissa and an adder for adding a binary one to the fourth fractional bit of the mantissa of said binary number, where the mantissa is determined by shifting the binary input value to the left until a one is to the left of the radix point, by discarding the one to the left of the radix point to leave the fractional part as said mantissa, and by determining a binary representation of the number of said shifts as said exponent.

* * * * *